United States Patent
Wenner et al.

(10) Patent No.: US 9,242,840 B2
(45) Date of Patent: Jan. 26, 2016

(54) ON-BOARD GRAPPLE HOIST FOR AGRICULTURE VEHICLE

(71) Applicants: Benjamin K. Wenner, St. Peter, MN (US); Tyler M. Wenner, Nicollet, MN (US)

(72) Inventors: Benjamin K. Wenner, St. Peter, MN (US); Tyler M. Wenner, Nicollet, MN (US)

( * ) Notice: Subject to any disclaimer, the term of this patent is extended or adjusted under 35 U.S.C. 154(b) by 252 days.

(21) Appl. No.: 13/856,522

(22) Filed: Apr. 4, 2013

(65) Prior Publication Data

US 2014/0301814 A1    Oct. 9, 2014

(51) Int. Cl.
  *A01D 51/00*    (2006.01)
  *B66C 23/44*    (2006.01)
  *B60P 1/54*    (2006.01)
  *B66C 3/06*    (2006.01)
  *B66C 3/04*    (2006.01)

(52) U.S. Cl.
  CPC ............... *B66C 23/44* (2013.01); *B60P 1/5433* (2013.01); *B66C 3/04* (2013.01); *B66C 3/06* (2013.01)

(58) Field of Classification Search
  CPC ....... B60P 1/5433; B66C 23/44; B66C 1/422; B66C 3/04
  USPC ................ 414/543; 294/112, 110.1, 106, 113
  See application file for complete search history.

(56) References Cited

U.S. PATENT DOCUMENTS

| | | | |
|---|---|---|---|
| 203,198 A * | 4/1878 | Ryan ............................. | 294/106 |
| 396,881 A * | 1/1889 | Lander .......................... | 294/112 |
| 584,880 A | 6/1897 | Knox | |
| 802,438 A * | 10/1905 | White ........................... | 294/106 |
| 1,150,671 A * | 8/1915 | Golden ......................... | 294/106 |
| 1,356,515 A * | 10/1920 | Burgson ....................... | 294/106 |
| 1,369,963 A * | 3/1921 | Carlson ......................... | 294/112 |
| 1,434,478 A * | 11/1922 | Carlson ......................... | 294/112 |
| 1,618,914 A | 2/1927 | Christensen, Sr. | |
| 1,686,658 A * | 10/1928 | Healey .......................... | 212/251 |
| 1,732,976 A * | 10/1929 | Schelle ......................... | 294/106 |
| 2,916,322 A | 12/1959 | Wirkkala | |
| 3,473,679 A * | 10/1969 | Weichel ........................ | 414/522 |
| 4,005,755 A | 2/1977 | Bakke et al. | |
| 4,505,376 A | 3/1985 | Bynum | |
| 4,808,062 A | 2/1989 | Bare | |
| 5,333,693 A | 8/1994 | Severeid | |
| 5,570,919 A * | 11/1996 | Eusebe ......................... | 294/111 |
| 5,618,075 A | 4/1997 | Baziuk | |
| 6,041,866 A | 3/2000 | Smith | |
| 7,278,671 B1 | 10/2007 | Herford | |
| 2003/0031547 A1 | 2/2003 | Stumvoll et al. | |
| 2007/0290171 A1* | 12/2007 | Martins Loureiro et al. ...................... | 252/301.4 R |

\* cited by examiner

*Primary Examiner* — Saul Rodriguez
*Assistant Examiner* — Mark Hageman
(74) *Attorney, Agent, or Firm* — Nikolai & Mersereau, P.A.; C. G. Mersereau

(57) ABSTRACT

A grapple hoist system for an agricultural vehicle is disclosed that includes a mast-mounted hoist including a boom arrangement and a winch and adapted to receive a main hoist cable and a grapple assembly including a plurality of radially-spaced, converging hook-shaped claws pivotally mounted about a common bulkhead and including a cable link attached to each of the hook-shaped claws, a plurality of cable link pulleys mounted on the common bulkhead, each cable link pulley adapted to carry an associated cable link, wherein the cable links are joined at the main cable beyond the cable link pulleys; and mounting devices for mounting the mast to an associated container or vehicle in a manner that enables it to rotate.

8 Claims, 4 Drawing Sheets

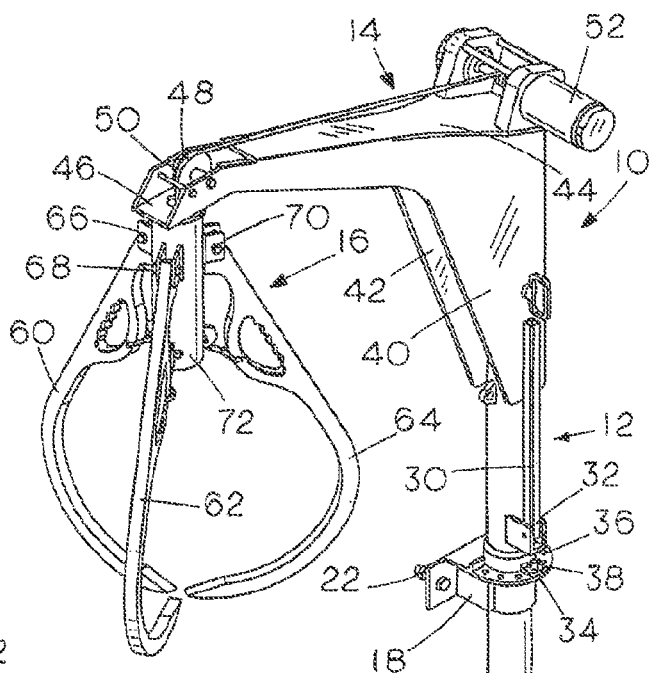
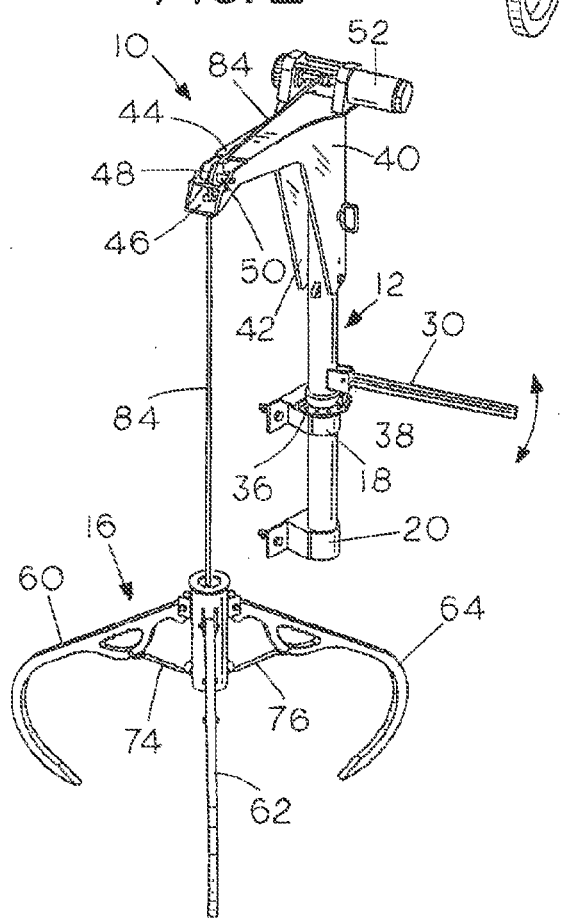

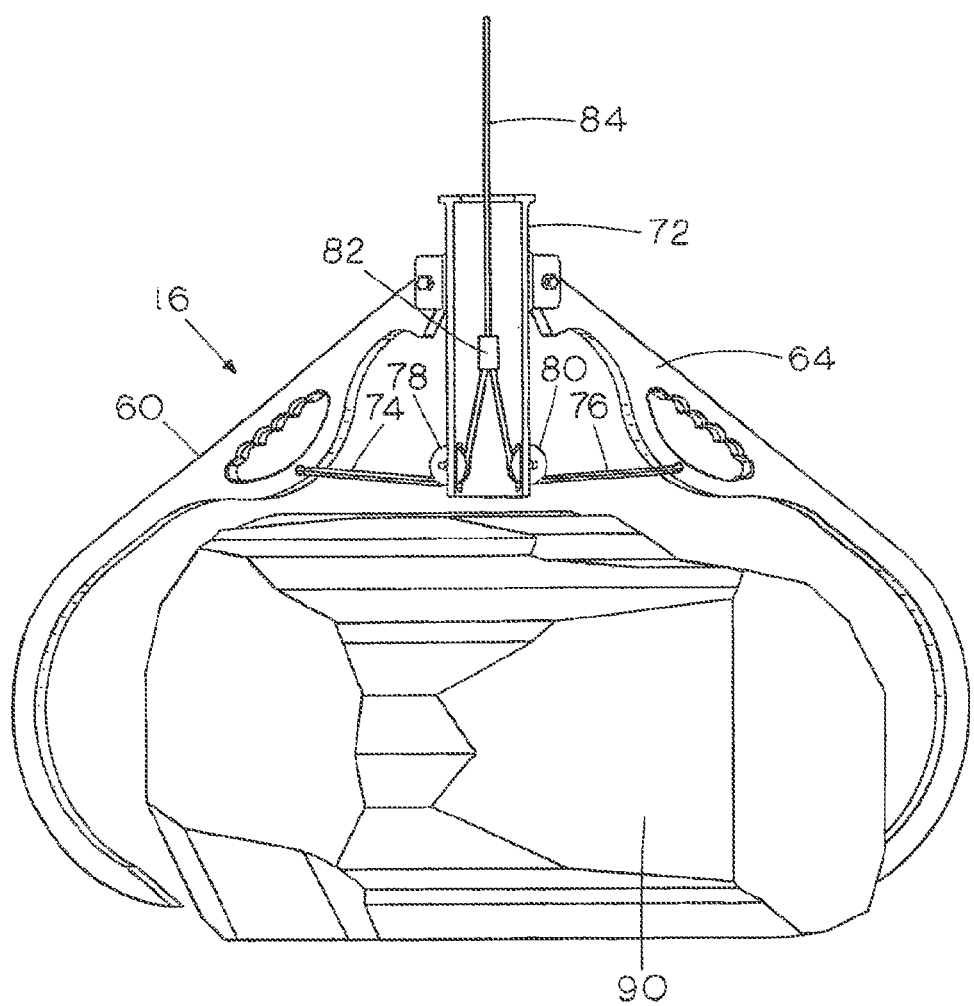

ON-BOARD GRAPPLE HOIST FOR AGRICULTURE VEHICLE

CROSS-REFERENCED TO RELATED APPLICATIONS

Not applicable

STATEMENT REGARDING FEDERALLY SPONSORED RESEARCH OR DEVELOPMENT

Not applicable

FIELD OF THE INVENTION

The present invention relates generally to the field of agriculture and to clearing, removal and extracting rocks from agricultural fields prior to pre-planting tillage topsoil treatments. More particularly, the invention relates to an on-board grapple hoist attachment for agriculture vehicles for removing and loading rocks from fields that would otherwise interfere with the tilling and planting process.

BACKGROUND OF THE INVENTION

Large rocks submerged, or partially submerged, in the topsoil are catastrophic to most agricultural equipment. It is a fact that most unexpected damage to such equipment is caused by large rocks present in the agricultural field topsoil Therefore, such large rocks need to be removed before an agricultural field can be properly tilled, planted and harvested.

The age-old evident seasonal phenomenon of freezing and thawing of the topsoil that causes submerged rocks to move upward towards the surface of the topsoil results in submerged rocks of all sizes emerging every spring when the ground thaws. This phenomenon is especially evident where loose, uninhabited soil conditions exist, which is the state of a typical agricultural field during the freezing and thawing cycles. The effects of this situation has long been and will always be an issue for conventional crop farming operations, big and small.

In order to prevent damage to expensive equipment, most farmers must look for and remove rocks every spring. This requires additional labor and machinery which, of course, is in addition to tillage, planting and harvesting processes. This process must be accomplished in the spring prior to planting when time spent cultivating and planting the field is more desirable in crop farms. Present approaches are also generally limited to the removal of rocks that are exposed at the surface of the topsoil prior to spring tillage and so the field-preparing rock removal process is never fully effective. This is due in part to the fact that some large rocks are not exposed, but are instead, barely submerged in the topsoil Therefore, these rocks are not removed, but instead may be struck by a pre-planting tillage implement. Therefore, large rocks may remain to hinder the tillage and planting process in many areas.

The assistance of separate special heavy equipment is necessary for a person to remove large rocks from the topsoil of an agricultural field. Rocks encountered by one operating a machine such as a tractor or other vehicle, with the means to store and transport large rocks, such as a container or box, possibly while also attempting to perform an operation such as preparing, tilling, planting, spraying, etc., is, of course, limited to removing rocks that he or she is capable of physically digging up and lifting into the storage container or box.

The modernization of farming has resulted in a farming operation using very large tractors to pull very wide multi-row tillage and seeding implements to complete spring tillage and planting operations in a shorter time. Such operations use technology like GPS-guided automatic steering. Such tractor and associated implements are capable of completing hundreds of acres of spring tillage in a day.

Further, in such a scenario, efficiency and time are the most important factors in the interest of saving labor and money. Furthermore, a farming operation may include working acreage located a long distance, possibly over 30 miles from the main farm site. When a tractor operator is tilling a field 30 miles from the farm site and comes upon a large rock that is impossible to physically lift, a responsible operator is then forced to "mark" the large rock via flag or GPS coordinates, and arrange for outside means of removing the large rock. This requires traveling 30 miles to and from the field in addition to removing the large rock. This is a common situation that, if avoided, could save a crop farming operation a significant amount of time and money.

RELATED ART

Grapple hoists of one type or another have long been known as a means of grabbing and lifting objects of interest, including stones. The art is repleat with a number of references showing such devices. For example, an early concept of a grapple device is shown in U.S. Pat. No. 584,880 issued to Knox in 1897. A cable-mounted grapple tong system is shown in U.S. Pat. No. 1,356,515 to Burgsen. Other examples of grapple-type devices are shown. Vehicle-mounted rock loading devices are shown, for example, in U.S. Pat. Nos. 1,618,914 and 4,505,376. A system having multiple cables is shown in U.S. Pat. No. 5,618,075. While these prior devices function to pick up objects of interest, they are generally mechanically complicated or require the use of a separate dedicated machine such as a skid steer loader, front-end loader, excavator, backhoe, tractor or other vehicle.

In addition, conventional grapple hoists have not been designed to attach to agricultural vehicles in a manner such that they may be used in conjunction with the normal intended uses of the vehicle, as needed, without interfering with those other uses. Thus, it would present a desirable advantage to have a grapple-type assembly that is attachable to a conventional farm vehicle with an associated container or "rock box" for intermittent use in disposing of large field rocks as they are encountered.

SUMMARY OF THE INVENTION

By means of the present invention, there is provided a mast-mounted grapple hoist attachment which can be mounted on the front-most part of a tractor that enables operators to conveniently pick up large rocks from agricultural fields using electric power available on a tractor and without otherwise interrupting the intended operation of the tractor. A hoist having an electric winch attached by a main cable to a grapple assembly which includes a plurality of radially-spaced, pivotally-mounted hook-shaped claws which share a common bulkhead and are individually joined to said main cable by cable links which are directed from the claws by associated pulleys designed to direct the lifting force to cause the claws to grasp a rock or other object while remaining adjustable to conform to a varying-shaped load and that include the ability to maintain and maximize the inward clasping force upon the rock while being hoisted upward from the ground. The hoist has an improved boom and mast which allows for the connected grapple assembly to be raised, lowered, rotated and conveniently collapsed for storage.

BRIEF DESCRIPTION OF THE DRAWINGS

In the drawings wherein like numerals denote like parts:
FIG. 1 is a perspective view of a grapple hoist assembly in accordance with the invention shown in a raised or retracted/stowed position;
FIG. 2 depicts the grapple hoist of FIG. 1 in a slightly reduced scale and in a lowered, grasping position;
FIG. 3 is an enlarged side elevational view of the grapple grabbing aspect grasping a large rock object with one claw removed for clarity.

DETAILED DESCRIPTION

The following description details one or more exemplary embodiments illustrating the present invention. It should be noted that the detailed descriptions are intended by way of example only and are not intended to limit the scope of the invention in any respect. It will be further understood that the embodiments of the invention can be modified by those skilled in the art while remaining in keeping with the inventive concepts.

FIGS. 1 and 2 depict perspective views of a grapple hoist assembly in a raised and lowered position, respectively. The grapple hoist assembly is shown generally at 10 and includes a support post or mast 12 that supports a boom arrangement 14 and a grapple assembly 16.

Figure 4:
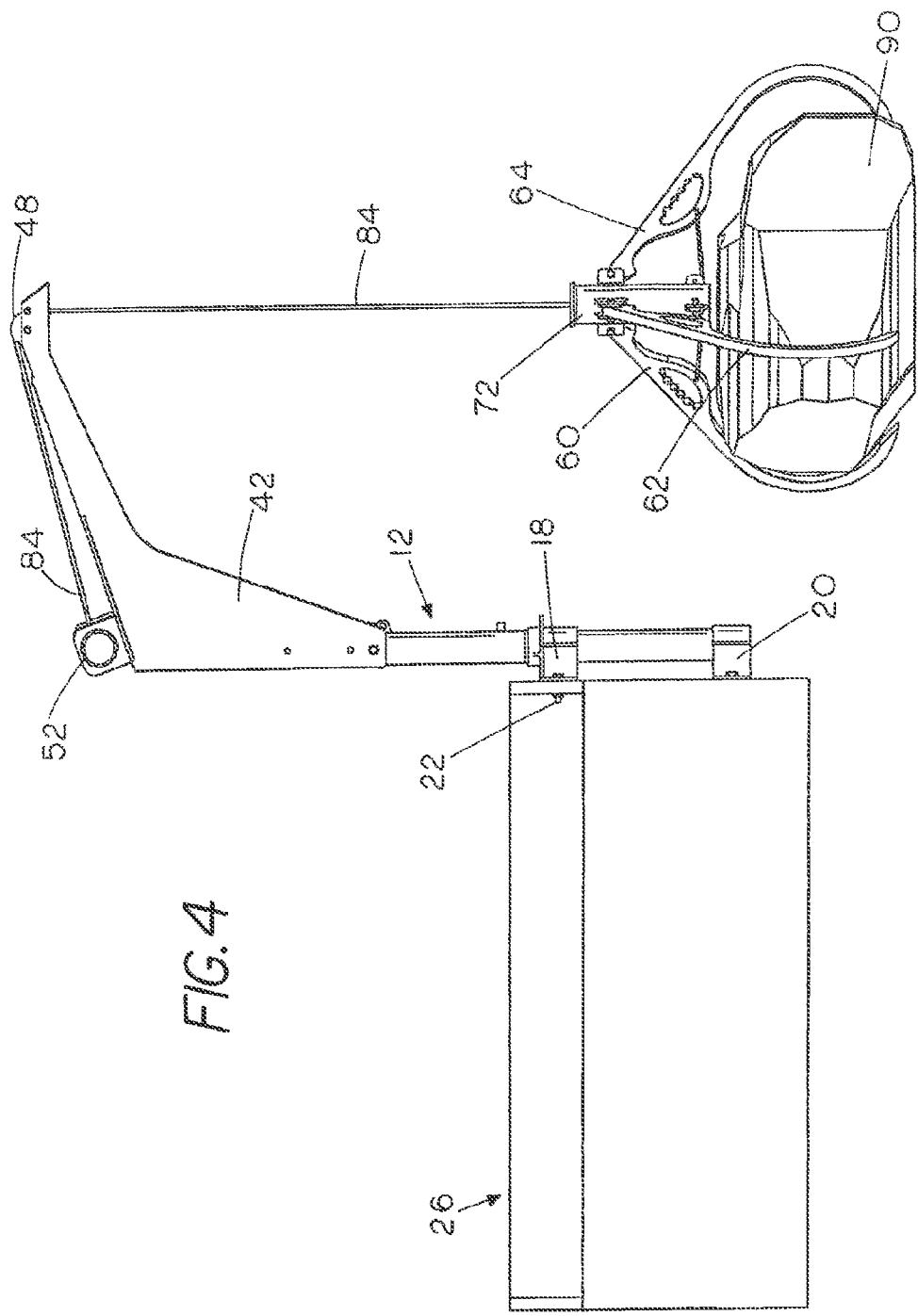
FIG. 4 is a perspective view of the grapple hoist including a grasped rock as in FIG. 3.
Figure 5:
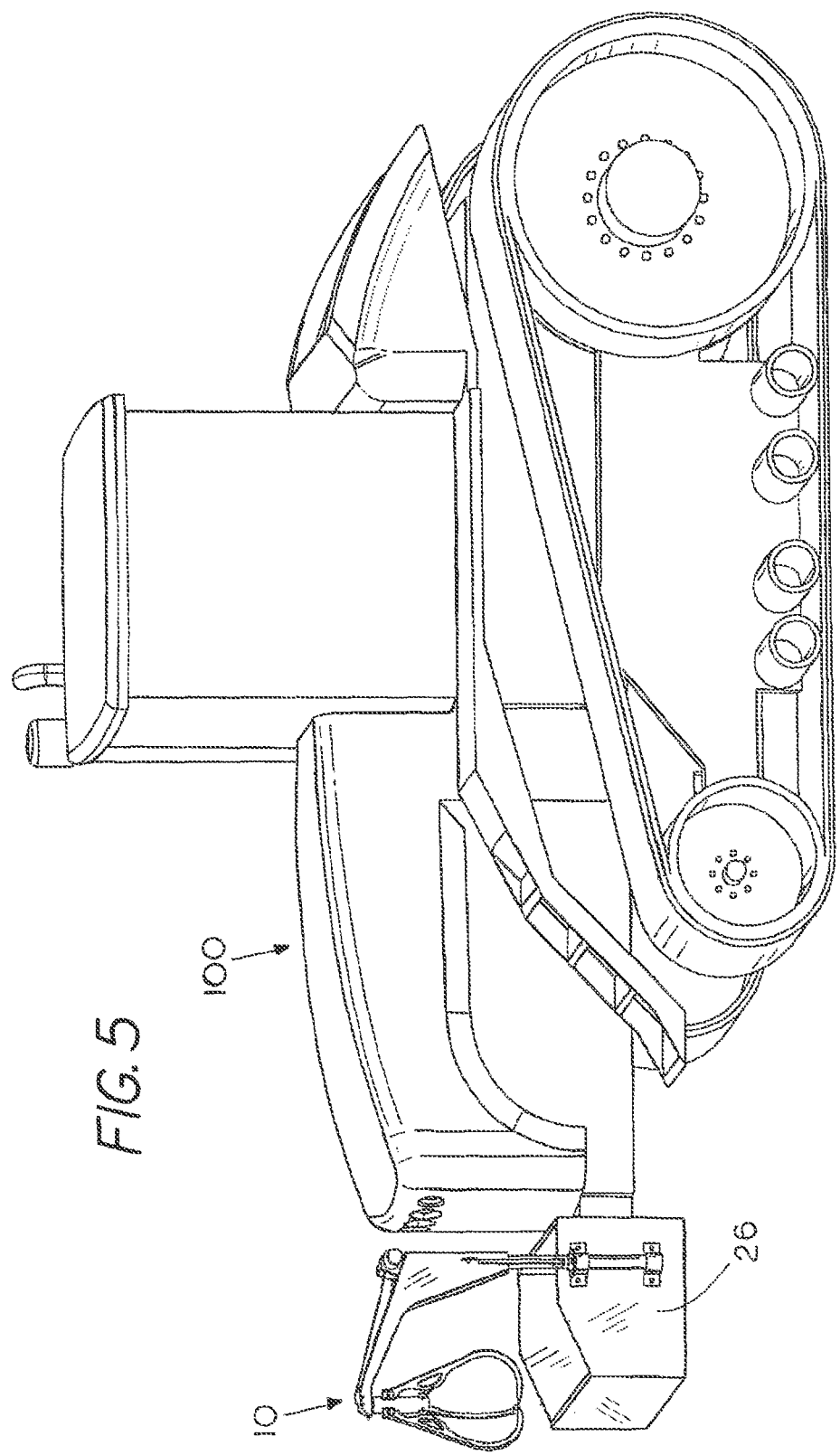
FIG. 5 shows a perspective view of the grapple hoist attached to a rock box or carry can container carried by a track-type agricultural vehicle.

The support post or mast 12 includes a plurality of heavy metal attachment fittings as at 18 and 20 with respective bolt fasteners, or the like, as at 22 and 24 for fastening and securing the mast to a collection container as at 26 shown in FIGS. 4 and 5. The mast 12 is journaled to be turned or rotated in the fittings 18 and 20 and includes a deployable handle 30 journaled at 32 to rotate the mast 12 to deposit rocks picked up by the grapple assembly 16 in container 26. The rotational position of the mast can be adjusted and controlled using an indexing member 34 that includes a plurality of spaced openings 36, which cooperate with a locking member 38 to provide a plurality of mast positions. The locking member 38 may be in the form of a spring-loaded or removable pin or member and is used to lock the mast in a desired rotational position as determined by the several spaced openings 36 as required during use or for stowing during road travel.

The boom includes an extending arm arrangement that includes spaced heavy metal shapes 40 and 42 spanned by stiffening members as at 44 and 46 and includes a pulley 48 mounted for rotation on a shaft 50 near the free end of said boom, and a mechanized, preferably electric, winch 52. Such winches are available in many sizes and are adapted to be connected to and operated by a vehicle electrical system. One such device is a Bear Claw™ ATV winch available from Extreme Max of Lino Lakes, Minn.

The grapple assembly 16 includes a plurality of heavy hook-shaped claws 60, 62 and 64 that are pivotally mounted at 66, 68 and 70, respectively, to a heavy common bulkhead member 72. Each of the claws is also fastened to a length of heavy claw cable or a cable link as at 74 and 76 which, in turn, is threaded around a cable link pulley mounted on said bulkhead member 72 aligned with the pivotal mount of the associated claw as at 78 and 80. The claw cables are gathered and clamped together at 82 where they are attached to a common main hoist cable 84 which is threaded over pulley 48 and attached to winch 52. The common main hoist cable 84 may optionally be a continuation of one of the cable links with the others attached.

The grapple hoist assembly is shown grasping a large rock 90 in FIGS. 3 and 4. It will be recognized that while the construction of the grapple assembly of the invention is quite simple, it also is configured to enhance the object-gripping aspect. As can be seen in the figures, the cable link pulleys such as 78 and 80 are mounted in a fixed relation to the respective pivoting claws as at 60 and 64 as they are mounted in fixed relation to bulkhead member 72. This results in the vertical lifting force on cable 84 being transferred by the claw cable links as at 74, 76 to what becomes substantially horizontal forces that increase the grasping force of the claws. In this manner, the heavier the load, the more powerful is the gripping force of the grapple. Thus, the cable link pulleys and the places of attachment of the cable links to the claws should be approximately at the same height in the grapple assembly when the claws are opened so that the majority of the required vertical hoisting force is transferred to a horizontal force to facilitate capture an object of interest.

In operation, the assembly is maneuvered into position above a rock or other object of interest that has been identified for disposal. The mast can be rotated as needed to position the grapple above the object. The winch 52 is released from a locked position and then rotated to release cable and lower the claws of the grapple which enables the claws to separate and open the grapple. The claws can then be positioned around the rock or other object of interest. The claws can be pushed into the ground, if necessary, to address a submerged or partially submerged rock to be removed. The rotation of the winch is then reversed and the rock is lifted and when it is raised above the associated debris container, the mast may again be rotated to position the rock or other object over the container. The winch rotation is again reversed and the rock is lowered into the container. The grapple claws will again open releasing the rock to the container.

An important aspect of the invention lies in the simplicity of construction. The pulley and cable system enables easy grasping and releasing of objects addressed by the grapple assembly as the claws will diverge and converge in unison. The only moving parts in the grasping/releasing cycle are the pulleys. As indicated, the configuration of the grapple maximizes the gripping aspect of the hoist. The rotation of the mast is accomplished by the operator of the device using the handle.

It should be noted that, while the illustrative embodiment includes 3 claws, space about 120° apart around the bulkhead in the grapple, any convenient number of gripping claws can be used in the grapple device, each one having an associated cable and pulley. In addition, the grapple hoist assembly of the invention can be made in any desirable size to handle smaller or very large rocks, some weighing over 1000 lbs. The system, including the rock box, is designed to be conveniently mounted on a tractor or other vehicle as that shown at 100 in FIG. 5.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A grapple hoist system for an agricultural vehicle, comprising:
   (a) a generally vertical mast, a hoist arrangement mounted on the mast including a boom and a mechanized winch mounted on the boom and adapted to receive and operate a single cable, a single cable attached to said winch;
   (b) a grapple assembly comprising three radially-spaced, converging bare arcuate-shaped claws pivotally mounted about a common bulkhead and including a cable link attached to each said bare arcuate-shaped claw, a plurality of cable link pulleys mounted on said common bulkhead, each cable link pulley aligned with a pivotal mount and adapted to carry an associated cable link, a juncture wherein said cable links are joined together and attached to said single cable at said juncture beyond said cable link pulleys to form a continuous structure; and
   (c) mounting devices for mounting said mast to an associated container or vehicle in a manner that enables it to rotate.

2. A grapple hoist system as in claim 1 further comprising a pulley for carrying said single cable mounted toward a free end of said boom.

3. A grapple hoist system as in claim 1 wherein said winch is an electric motorized winch designed to be connected to a vehicle electrical system.

4. A grapple hoist system as in claim 1 further comprising a debris container for carrying said mast mounted thereto.

5. A grapple hoist system as in claim 4 wherein the system is designed to be carried by an agricultural vehicle.

6. A grapple hoist system as in claim 1 wherein said cable link pulleys are mounted on said common bulkhead at a level relative to the attachment level of said cable links to transfer and direct vertical lift forces to substantially horizontal forces at said claws.

7. A grapple hoist system as in claim 1 wherein said claws are radially spaced about 120° apart.

8. A grapple hoist system as in claim 1 wherein said boom is mounted at a fixed angle to said mast.

\* \* \* \* \*